United States Patent
DiMascio (10) Patent No.: US 9,733,932 B2
(45) Date of Patent: *Aug. 15, 2017

(54) CONTEXT-SPECIFIC VIEW OF A HIERARCHICAL DATA STRUCTURE

(71) Applicant: International Business Machines Corporation, Armonk, NY (US)

(72) Inventor: Carmine M. DiMascio, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,368

(22) Filed: Dec. 20, 2016

(65) Prior Publication Data

US 2017/0090917 A1    Mar. 30, 2017

Related U.S. Application Data

(63) Continuation of application No. 14/739,559, filed on Jun. 15, 2015.

(51) Int. Cl.
*G06F 9/44* (2006.01)
*G06Q 10/06* (2012.01)

(52) U.S. Cl.
CPC .............. *G06F 8/71* (2013.01); *G06F 8/20* (2013.01); *G06Q 10/06* (2013.01); *G06F 8/30* (2013.01)

(58) Field of Classification Search
CPC .............. G06F 8/20; G06F 8/71; G06Q 10/06
USPC .................................................. 717/101, 120
See application file for complete search history.

(56) References Cited

U.S. PATENT DOCUMENTS

| | | | |
|---|---|---|---|
| 4,613,946 A | 9/1986 | Forman | |
| 6,029,172 A | 2/2000 | Jorna et al. | |
| 6,754,885 B1* | 6/2004 | Dardinski | G05B 15/02 717/113 |
| 7,089,530 B1* | 8/2006 | Dardinski | G05B 15/02 700/83 |
| 7,299,450 B2 | 11/2007 | Livshits et al. | |
| 7,392,488 B2 | 6/2008 | Card et al. | |
| 7,437,686 B1 | 10/2008 | Bernstein et al. | |
| 7,676,485 B2 | 3/2010 | Elfayoumy et al. | |
| 7,984,388 B2 | 7/2011 | Dieberger et al. | |
| 8,495,571 B2 | 7/2013 | Wall et al. | |
| 8,806,379 B2 | 8/2014 | Chen et al. | |
| 8,949,769 B2 | 2/2015 | Biehl et al. | |
| 9,009,665 B2 | 4/2015 | Supplisson et al. | |
| 9,063,725 B2 | 6/2015 | Tseitlin et al. | |

(Continued)

OTHER PUBLICATIONS

Conradi et al., "Version Models for Software Configuration Management", 1998.*

(Continued)

*Primary Examiner* — Phillip H Nguyen
(74) *Attorney, Agent, or Firm* — Stephen R. Yoder (57) ABSTRACT

Dynamic ontological working sets support the automatic identification of a context-specific working set (or a visualization of a tree in a hierarchical data structure) that displays those tree nodes that are most relevant to an identified context. Pre-defined rules are used to determine a level of relevance to be applied when identifying the context-specific working set. Context-specific working sets may be displayed automatically when identified.

1 Claim, 3 Drawing Sheets

(56) References Cited

U.S. PATENT DOCUMENTS

| | | | |
|---|---|---|---|
| 9,292,281 B2 | 3/2016 | Balachandran | |
| 2002/0040469 A1* | 4/2002 | Pramberger | G06F 8/71 717/121 |
| 2004/0205726 A1* | 10/2004 | Chedgey | G06F 8/71 717/125 |
| 2006/0206866 A1* | 9/2006 | Eldrige | G05B 15/02 717/122 |
| 2008/0086445 A1 | 4/2008 | Antony et al. | |
| 2009/0210855 A1* | 8/2009 | Ramanathan | G06F 8/36 717/102 |
| 2010/0169865 A1 | 7/2010 | Clemm | |
| 2010/0306364 A1 | 12/2010 | Terry et al. | |
| 2011/0055153 A1 | 3/2011 | Hashimoto et al. | |
| 2011/0161931 A1 | 6/2011 | Camelon et al. | |
| 2012/0173500 A1 | 7/2012 | Chakrabarti et al. | |
| 2013/0152047 A1 | 6/2013 | Moorthi et al. | |
| 2013/0194294 A1 | 8/2013 | Zhao et al. | |
| 2014/0282400 A1 | 9/2014 | Moorthi et al. | |

OTHER PUBLICATIONS

Wu et al., "A Multi-Perspective Software Visualization Environment", 2000.*

Aragones et al.; "An Ontology-Based Architecture for Adaptive Work-Centered User Interface Technology"; An IP.com Prior Art Database Technical Disclosure; IP.com No. 000134526; Mar. 3, 2006 pp. 1-139.

Rice, Steve; "Working with Multiple Hierarchical Relationships"; Life with Semaphore; May 28, 2013; pp. 1-5; <http://life.smartlogic.com/2013/05/working-with-multiple-hierarchical-relationships/>.

"Dynamic Working Sets for Eclipse."; javadude; Updated Jul. 9, 2011; pp. 1-7; <https://code.google.com/p/javadude/wiki/DynarnicWorkingSets>.

DiMascio, et al., "Context-Specific View of a Hierarchical Data Structure", U.S. Appl. No. 14/739,559, filed Jun. 15, 2015, pp. 1-24.

DiMascio, et al., "Context-Specific View of a Hierarchical Data Structure", U.S. Appl. No. 15/084,822, filed Mar. 30, 2016, pp. 1-20.

DiMascio, et al., "Context-Specific View of a Hierarchical Data Structure", U.S. Appl. No. 15/384,406, filed Dec. 20, 2016, pp. 1-20.

IBM Appendix P.: "List of IBM Patents or Patent Applications Treated As Related", Dated Dec. 20, 2016, 2 pages.

Bleco, et al., "Business Intelligence on Complex Graph Data", BEWEB '12, Mar. 30, 2012, Berlin, Germany, Copyright 2012 AMC, pp. 13-20.

Thao, et al., "Using Versioned Tree Data Structure, Change Detect on and Node Identity for Three-way XML Merging". DocEng2010, Sep. 21-24, 2010, Manchester, United Kingdom, Copyright 2010 ACM, pp. 77-86.

* cited by examiner

CONTEXT-SPECIFIC VIEW OF A HIERARCHICAL DATA STRUCTURE

BACKGROUND

The present invention relates generally to the field of logical file directories, and more particularly to working set technology.

Software development is the computer programming, documenting, testing, and bug fixing involved in creating and maintaining applications and frameworks involved in a software release life cycle that involves a software product. The term refers to a process of writing and maintaining the source code, but in a broader sense of the term it includes all that is involved between the conception of the desired software through to the final manifestation of the software, ideally in a planned and structured process.

Software configuration management (SCM) is the task of tracking and controlling changes in the software. SCM practices include revision control and the establishment of baselines. Oftentimes, SCM tools support dynamic discovery, loading, and running of application plug-ins. Basically, SCM tools handle the logistics of finding and running the right program code. Each plug-in can then focus on doing a small number of tasks well, such as defining, testing, animating, publishing, compiling, debugging, and/or diagramming.

The concept of a "working set" is known among collaborative working groups, particularly in software development. A working set, as used herein, is a group of elements for display in views or for performing operations on a set of elements. The state of the art working set requires manual, thoughtful effort to create. These working sets can be configured to include, for example, problems view, tasks view, and bookmarks view filtered from a database for a specified working set.

SUMMARY

In one aspect of the present invention, a method, a computer program product, and a system includes: (i) identifying, from a hierarchical data structure representing a set of software configuration management (SCM) tools for a selected software program, a set of contextual objects; (ii) determining, from the hierarchical data structure, an internodal relationship between two contextual objects of the set of contextual objects; (iii) storing relationship data of the internodal relationship as a set of triples in a database, a first triple associating a first node within the hierarchical data structure with one of the two contextual objects and with the internodal relationship, a second triple associating a second node within the hierarchical data structure with another of the two contextual objects and with the internodal relationship; (iv) displaying the set of contextual objects for user-selection of individual contextual objects within the set of contextual objects; (v) receiving a user-context indicator responsive to a user-selection of the one of the two contextual objects from the displayed set of contextual objects, the user-context indicator corresponding to the one of the two contextual objects, the user-context indicator being creation of a third contextual object; (vi) determining a subset of the hierarchical data structure corresponding to the user-context indicator; and (vii) displaying the subset of the hierarchical data structure in a tree view without human intervention. The set of contextual objects are a first program view and a first patch stream, the first patch stream corresponds to the first programming view.

DETAILED DESCRIPTION

Dynamic ontological working sets support the automatic identification of a context-specific working set (or a visualization of a tree in a hierarchical data structure) that displays those tree nodes that are most relevant to an identified context. Pre-defined rules are used to determine a level of relevance to be applied when identifying the context-specific working set. Context-specific working sets may be displayed automatically when identified. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
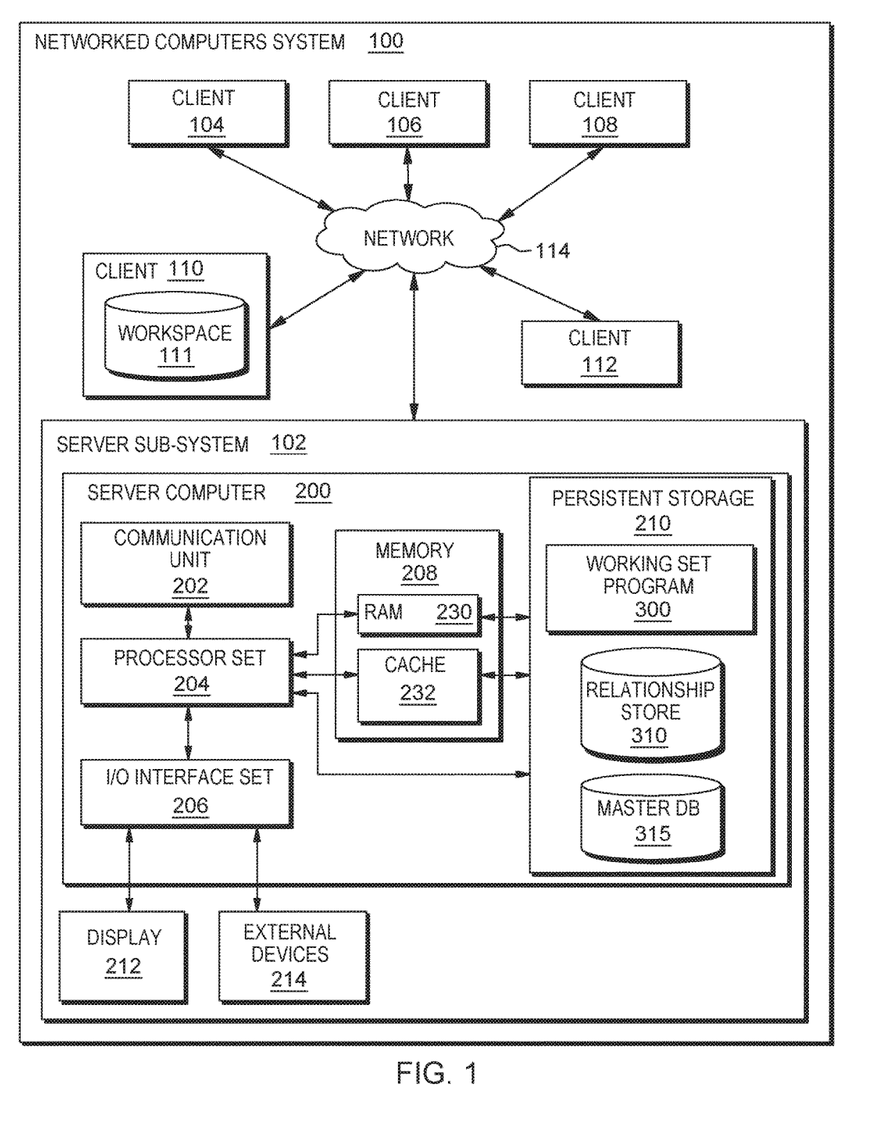
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; working set program 300; node relationship store 310; and master tree database (DB) 315.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
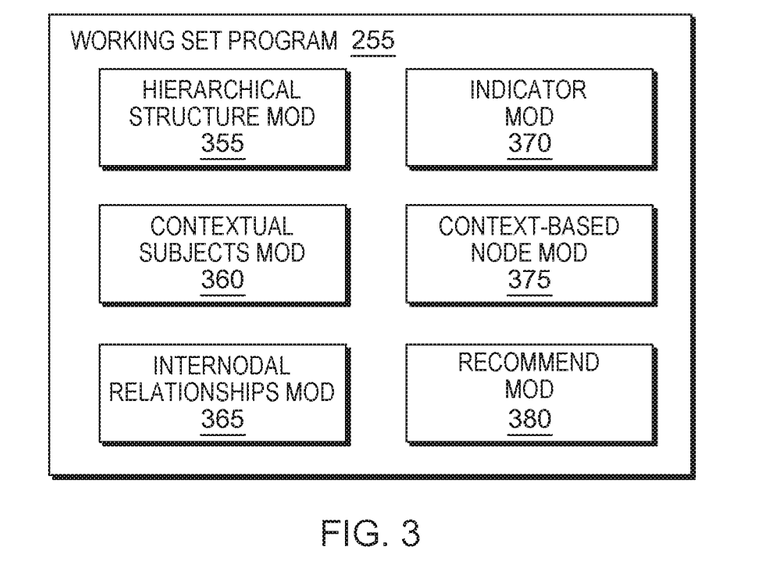
FIG. 3 is a schematic view of a machine logic (for example, software) portion of the first embodiment system.

Working set program 300 operates to identify relevant working sets for display to a user based on context and pre-defined relevancy criteria. In some embodiments, the working sets reflect the relevant tree nodes of a master tree.

Some embodiments of the present invention recognize the following facts, potential problems and/or potential areas for improvement with respect to the current state of the art: (i) conventional directory hierarchies do not capture relationships between views and specific streams; (ii) while working with a particular view of code, it is oftentimes helpful to have its related stream readily available (this allows a user to easily check for new work delivered to the stream); (iii) oftentimes, a user manually creates a working set that includes working view(s) (workspace), the related development stream(s), and the related integration stream(s); and/or (iv) users often dig through a complex tree structure to locate the few relevant streams, or related files, that are needed for a specific task.

By using the concept of dynamic ontological working sets, a working set can be dynamically generated for a user based on both user-context and relationship information provided for each node of a given tree, thus ensuring the content displayed to the user is relevant to the context in which the user is working with the given tree.

The following simple example is presented to illustrate the function of some embodiments of the present invention. Software developers typically work on many different code streams simultaneously. For example, Able, a software developer, is working on a new feature in a feature stream, a set of bug fixes on a patch stream, and product code on the release stream. In this example, Able is using a typical SCM tool that presents him with a cluttered navigation tree (such as the tree shown below) when only a fraction of the information in the tree is important to him at any given time.

(A) Views
    i. me_main_view
    ii. me_patch1_dev_view
    iii. me_feature1_view (B) Streams
    i. main
        a. feature 1
            i. patch1
                1. me_dev_patch1
                2. user2_dev_patch1
                3. user3_dev_patch1
            ii. patch2
            iii. patch3
        b. feature 2
        c. feature 3
        d. feature 4

Using a system with dynamic ontological working sets, as disclosed herein, a software developer is provided a new view of the navigation tree that contains only relevant information, or nodes. This new view of the navigation tree is a context-specific working set discovered by, for example, working set program 300, in view of the ontological relationships between the various nodes of the navigation tree. These relationships are expressed as triples, or relationship triples, where each triple is "subject->relationship->object." In each triple, the target tree node is the "subject." The target tree node is associated with data, or metadata, that describes its relationships to other tree nodes within the navigation tree. These other nodes are the objects of the relationship according to the relationship triples. The navigation tree shown above is represented below as a "revised navigation tree" that includes relationship data in parenthesis by the corresponding node.
  (A) Views
    iv. me_main_view (on-stream->main)
    v. me_patch1_dev_view (on-stream->me_dev_patch1)
    vi. me_feature1_view (on-stream->feature1)
  (B) Streams
    ii. main
      a. feature 1 (is-child-stream-of->main)
        i. patch1 (is-child-stream-of->feature1)
          1. me_dev_patch1 (is-child-stream-of->patch1)
          2. user2_dev_patch1 (is-child-stream-of->patch1)
          3. user3_dev_patch1 (is-child-stream-of->patch1)
        ii. patch2 (is-child-stream-of->feature1)
        iii. patch3 (is-child-stream-of->feature1)
      b. feature 2 (is-child-stream-of->main)
      c. feature 3 (is-child-stream-of->main)
      d. feature 4 (is-child-stream-of->main)

In some embodiments of the present invention, the relationship data (or triple data) is stored as tags on each tree node. Further, in some embodiments, node relationship store 310 maintains the relationship data. As shown in the revised navigation tree above, next to each tree node, in parenthesis, is the relationship and object information (two portions of the triples described above). In some embodiments of the present invention, this sub-set of relationship data is stored as a tag associated with the corresponding target node, or object.

In some embodiments, the ontology may provide numerous relationships per node. In this case, dynamic working sets might recommend a working set that is, perhaps still perceived to be too large. In such a case, some embodiments may allow the system to apply rules that allow only a subset of relationships to be expanded. These rules can be generated by the system by taking into consideration contextual elements that extend beyond the scope of tree hierarchy. For example, the system might generate rules based on the user's context within the user interface.

In the revised navigation tree, Able is presented with a lot of information, most of which is irrelevant to what he is currently working on. That is, only a subset of the tree nodes are currently relevant. Assume, for example, that Able wants to start working with his patch view, the "me_patch1_dev_view" node in the above navigation tree. According to some embodiments of the present invention, when Able, selects the "me_patch1_dev_view" node, a new working set is dynamically created and displayed to Able. Alternatively, a recommended reduced tree view is proposed, which Able may accept. The particular function of display versus recommend may be determined according to IT policy, user preference, or otherwise pre-selected. The displayed, or recommended, working set will show only the information related to or relevant to the node "me_patch_dev_view," which was selected by the user. This related/relevant information is determined by the ontological relationships described by each tree node.

Figure 2:
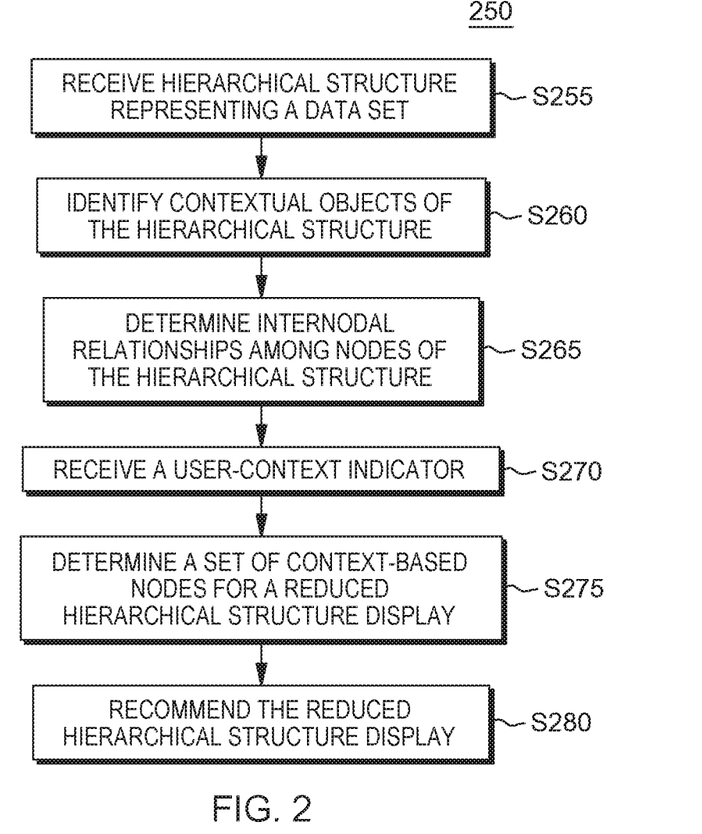
FIG. 2 is a flowchart showing a method performed, at least in part, by the first embodiment system.

Concluding the above example, when Able clicks on "me_patch_dev_view," the new working set, whether displayed or merely recommended, is as follows:
  i. me_patch1_dev_view
  ii. me_dev_patch1
  iii. patch1
  iv. feature1
  v. main FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where hierarchical structure module ("mod") 355 receives hierarchical structure representing a data set. In this example, the hierarchical structure a collapsible hierarchical tree view made up of nodes representing software configuration management (SCM) tools allowing for development, feature, debug, and production environments.

Processing proceeds to step S260, where contextual object mod 360 identifies contextual objects of the hierarchical structure. Contextual objects include the various nodes making up the hierarchical structure as well as the concepts and ontologies defined by the hierarchical structure. In this example, contextual objects include programming views, feature streams, patch streams, integration streams, development streams, and/or release streams. Alternatively, contextual objects, in addition to or instead of the example objects, include: (i) snapshot labels; (ii) baseline labels; (iii) source code change sets, or commits; (iv) work items that correspond to commits; (v) work items that correspond to changes that occurred between two or more baselines; and/or (vi) work items related to a stream. Contextual objects are also identified as they are created, for example, when a particular view is created the new view is identified as a contextual object.

Processing proceeds to step S265, where internodal relationships mod 365 determines internodal relationships among nodes of the hierarchical structure received in step S255. As described in more detail herein, the internodal relationships are one of three elements recorded to establish relationship data in the form a triples. The triple is in the form of <subject/relationship/object>, where the internodal relationship is the "relationship" and it is associated with an object of the hierarchical structure, such as a node. Finally, for a given node (or contextual subject), the subject, a relationship is recorded for another object, the object, within the hierarchical structure. Similar to contextual subjects, in this example, internodal relationships are established upon creation of a node. Alternatively, internodal relationships are established by a system administrator, or a user who creates the new node. Alternatively, the internodal relationships involve more than three elements, for example, where there are relationships between more than two nodes, there will be a non-triple relationship established.

Processing proceeds to step S270, where indicator mod 370 receives a user-context indicator. In this example, a user-context indicator is received when a user selects a node, or contextual object, within the hierarchical structure. Alternatively, user-context indicators include: (i) creation of a contextual object, such as a view; and/or (ii) a pre-defined user action, such as user-selection from a prompt to indicate context. Alternatively, where selectors and/or rules are applied, user-context indicators, or contextual indicators, include, for example, the user's context within the UI (user interface).

In some embodiments of the present invention, user-context is determined by user-selection of a node from a set of displayed nodes from the hierarchical structure. Some embodiments of the present invention are directed to a user interface (UI) displaying contextual objects and allowing a user to select and drill down corresponding nodes based on automatically determined contextual subject selections. Additionally, some embodiments allow a user to select and save an auto-generated contextual working set for later use.

Processing proceeds to step S275, where context-based node mod 375 determines a set of context-based nodes for a reduced hierarchical structure display. Throughout this specification, the term "working set" may be used interchangeably with "reduced hierarchical structure display." A working set is a subset of a larger hierarchical structure. The working set is generated on the basis of context supported by domain-specific ontology relationships. In this example, the working set is determined based on receipt of a context indicator and determination of relevant, or related, nodes.

As discussed briefly herein, the relatedness of nodes may be pre-determined to limit the number of context-based nodes that make up the working set. In some embodiments of the present invention, rules are applied to short circuit a chain of relationships. For example, the context-based node defines rules, or defines a mechanism to enable users to supply rules, that ensure only items that are a specified number of relationships away are displayed to the user.

Processing ends at step S280, where recommend mod 380 recommends the reduced hierarchical structure display. In this example, the reduced hierarchical structure display, or working set, is merely recommended to the user. Alternatively, the working set is automatically presented to the user upon receipt of the user-context indicator, received in step S275.

Further embodiments of the present invention are discussed in the paragraphs that follow.

Some embodiments of the present invention provide a refined list that limits relevant node display to those nodes that have a first degree relationship to the target node, that is, those nodes that are objects of relationships being only one relationship away from the target node.

Some embodiments of the present invention use RDF-style (resource description framework) queries on the relationship data to produce more complex relationship queries. For example, these queries are expressed by the application developer and used to deliver better relationship results.

Some embodiments of the present invention support advanced determination of which nodes of a given navigation tree respond with a dynamically generated working set upon selection of the node (referred to herein as the "responsive nodes." For example, an application developer preselects the responsive nodes. Alternatively, the responsive nodes are toggled by an application preference. Alternatively, the responsive nodes are identified by tagging selected nodes such that they create a dynamically generated working set when accessed.

Another example navigation tree follows. It should be noted that while specific navigation trees are provided herein, they are examples for illustration purposes. The navigation tree may be in any form that establishes a collapsible hierarchical tree view.

(A) Root
  i. Views
    a. view_A
    b. view_B
    c. view_X
  iii. Metadata
    a. Streams
      i. parent_stream_1
        1. child_stream_1
        2. child_stream_2
      ii. parent_stream_2
        1. child_stream_1
        2. child_stream_2
      iii. parent_stream_X
        1. child_stream_1
        2. child_stream_2

Some embodiments of the present invention rely on the application in question to maintain an ontology of relationships between its various objects presented in a navigation tree. In this following example, the application maintains the ontology and the user cannot modify the ontology as generated by the application. Alternatively, the user has access to manipulate the ontology prepared by the application.

Based on the above-provided example navigation tree, the application maintains relationships for each view, such as view_A, there is a corresponding development stream and integration stream. Regarding ongoing maintenance, each time a new view is created, the application simply updates the ontology with the new relationship data. For example, when view_A is created, the application recognizes the corresponding development and integration streams. Accordingly, the following triples are generated to maintain the known relationship data:

TABLE 1

| Relationship Data Stored as Triples | | |
| --- | --- | --- |
| SUBJECT | RELATIONSHIP | OBJECT |
| view_A | has-dev-stream | patch_stream_1 |
| view_A | has-int-stream | parent_stream_2 |

Other domain-specific relationships could be documented in table 1, however, for illustration purposes, only these two example relationships are shown. According to some embodiments of the present invention, when a user selects "view_A" in the navigation tree, a recommended working set is generated based on the stored triples associated with "view_A." Alternatively, the recommended working set is generated according to other contextual clues including: (i) creation of "view_A;" (ii) pre-defined user action; and/or (iii) user selection of an item from a context menu entitled, "recommend working set." It is shown in the output that follows, that some embodiments of the present invention recognize that when a user creates a new view, not only is that new view relevant to the user, but also the development stream and the integration stream are relevant to the user. Accordingly, an automatic recommendation of a working set is produced, which includes only those three items as root items.

The recommended working set according to the above navigation tree and the selection of "view_A" is as follows:
(A) Root
  i. view_A
  ii. parent_stream_2
  iii. patch_stream_1

Some embodiments of the present invention provide a filter bar to a user for selecting a target relationship within a given navigation tree. By selecting a particular relationship, nodes within the tree that are objects of the particular relationship are presented to the user. For example, if a user selects "view_A" in the navigation tree, a corresponding filter UI (user interface) supports the selection of a relationship, such as "has-dev-stream," to reveal only those nodes in the navigation tree that match the selected relationship.

Some embodiments of the present invention use information such as project natures as part of the ontology for recommending a component, or node, of a high level working set.

In some embodiments of the present invention, upon receipt of a recommended working set, the user applies regular expression matching to further refine the recommended working set.

Some embodiments of the present invention may include one, or more, of the following features, characteristics and/or advantages: (i) enabling a working set to be created or suggested automatically based on ontological relationships; (ii) unlike conventional file managers, which display default relationships of parent, grandparent, sibling, and/or children, working sets dynamically associate nodes according to customizable relationship data corresponding to each node within a given tree; (iii) supports making a decision whether or not to pull new content from a related stream into a current view, or workspace; (iv) filters out irrelevant information so that a user views only relevant information according to contextual clues; (v) enables a navigation tree to be represented as a different structure; (vi) does not require an understanding by the user of the underlying ontology for manual construction of meaningful relationships; (vii) uses context to recommend a new representation of the navigation tree; (viii) the user can always return to the original representation of the navigation tree because the user ultimately controls the view; (ix) does not require user intervention to build some new ontologies for the working set; (x) does not require a user or an administrator to manually create a useful representation of the hierarchical tree view; (xi) relates the field of ontology and natural language parsing to the concept of working sets; (xii) the navigation tree incorporates internodal relationship data; (xiii) determines a simplified view that contains information relevant to the user; and/or (xiv) displays a smaller working set of information based on a set of relationships associated with a target tree node.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to identify, from a hierarchical data structure representing a set of software configuration management (SCM) tools for a selected software program, a set of contextual objects;
second program instructions programmed to determine, from the hierarchical data structure, an internodal relationship between two contextual objects of the set of contextual objects;
third program instructions programmed to store relationship data of the internodal relationship as a set of triples in a database, a first triple associating a first node within the hierarchical data structure with one of the two contextual objects and with the internodal relationship, a second triple associating a second node within the hierarchical data structure with another of the two contextual objects and with the internodal relationship;
fourth program instructions programmed to display the set of contextual objects for user-selection of individual contextual objects within the set of contextual objects;
fifth program instructions programmed to receive a user-context indicator responsive to a user-selection of the one of the two contextual objects from the displayed set of contextual objects, the user-context indicator corresponding to the one of the two contextual objects, the user-context indicator being creation of a third contextual object;
sixth program instructions programmed to determine a subset of the hierarchical data structure corresponding to the user-context indicator; and
seventh program instructions programmed to display the subset of the hierarchical data structure in a tree view without human intervention;
wherein:
the set of contextual objects are a first program view and a first patch stream, the first patch stream corresponds to the first programming view.

* * * * *